United States Patent [19]

Fritz

[11] Patent Number: 5,717,937
[45] Date of Patent: Feb. 10, 1998

[54] CIRCUIT FOR SELECTING AND DESIGNATING A MASTER BATTERY PACK IN A COMPUTER SYSTEM

[75] Inventor: Brian C. Fritz, The Woodlands, Tex.

[73] Assignee: Compaq Computer Corporation, Houston, Tex.

[21] Appl. No.: 613,441

[22] Filed: Mar. 4, 1996

[51] Int. Cl.$^6$ ............................................. G06F 1/30
[52] U.S. Cl. ..................... 395/750.01; 364/492; 320/30; 320/5; 307/66
[58] Field of Search ............................... 395/750; 320/6, 320/15, 39, 5, 30; 307/66; 364/492, 707; 365/226, 229

[56] References Cited

U.S. PATENT DOCUMENTS

| | | | |
|---|---|---|---|
| 4,295,097 | 10/1981 | Thompson et al. | 324/429 |
| 4,323,987 | 4/1982 | Holtz et al. | 365/229 |
| 4,365,293 | 12/1982 | Holtz | 364/464.2 |
| 5,300,874 | 4/1994 | Shimamoto et al. | 320/15 |
| 5,352,970 | 10/1994 | Armstrong, II | 320/39 |
| 5,563,493 | 10/1996 | Matsuda et al. | 320/6 |

FOREIGN PATENT DOCUMENTS

| | | |
|---|---|---|
| 0463593A2 | 1/1992 | European Pat. Off. . |
| 0607041A2 | 7/1994 | European Pat. Off. . |

OTHER PUBLICATIONS

Electronic Design, PIPS Special Editorial Feature, vol. 43, Jul. 10, 1995, pp. 115–121.
Intel System Management Bus Specification, Apr. 21, 1994, Rev 0.95, pp. 1–17.
Intel Smart Battery Selector Specification, Apr. 13, 1995, Rev 0.9, pp. 1–16.
Philips Data Handbook Ic12, Sep. 6, 1995, pp. 46–82.

*Primary Examiner*—Gopal C. Ray
*Attorney, Agent, or Firm*—Pravel, Hewitt, Kimball & Krieger

[57] ABSTRACT

The present invention relates to circuitry for selecting a master battery pack for supplying power to a computer system capable of incorporating multiple battery packs. A bi-directional master battery signal is communicated to the microcontroller of each installed battery pack and arbitration circuitry contained within the host computer system. The master battery signal operates in conjunction with a serial communications interface between each of the installed battery packs and the host computer system. Battery status information is communicated to the host computer system via the serial communications interface, and the host computer system then selects a master battery pack. The battery pack selected to be the master asserts the master battery signal while all other battery packs monitor this signal waiting for it to be deasserted. Other battery packs utilize the master battery signal to control their own charge and discharge circuitry. Deassertion of the master battery signal denotes that the master battery pack is no longer capable of supplying power to the host computer system and the master battery pack arbitration process is repeated.

31 Claims, 7 Drawing Sheets

CIRCUIT FOR SELECTING AND DESIGNATING A MASTER BATTERY PACK IN A COMPUTER SYSTEM

FIELD OF THE INVENTION

The present invention relates to a computer system that uses removable battery packs for power, and more particularly to a circuit for efficiently designating one battery pack as the master.

DESCRIPTION OF PRIOR ART

Computers are often needed in locations where conventional alternating current power is not available, and rechargeable batteries are typically used as an alternative source of power. Examples include nickel-based batteries and lithium ion batteries. These batteries are capable of providing power to a portable computer system for several hours. Battery cells are incorporated in a battery pack, with the battery cells typically arranged in a series fashion. Sometimes, each pack includes two or more cells in parallel. The battery pack is usually recharged in either an external charger or by the power supply of the host computer system.

One fundamental requirement of lithium ion batteries is that they be charged and discharged in a controlled manner. This requirement is predominantly due to a potential for a lithium battery to explode if improperly charged or discharged. Battery pack manufacturers typically include a pair of field effect transistors (FETs) capable of blocking battery charging and discharging, thereby adding a layer of safety.

In addition, a sensor circuit is often integrated into the battery pack to monitor the voltage of each lithium ion cell and provide fuel gauging. Fuel gauging is the process of determining how much useful charge remains in the battery, and is typically accomplished by Coulomb counting. The terminal cell voltage is indicative of at least four different cell states. In one state, the cell is properly charged and capable of providing power to the computer system. In another state, the cell becomes deeply discharged. When a nickel-based or lithium ion cell becomes deeply discharged, the terminal cell voltage drops to a deeply discharged minimum voltage indicating that the cell cannot be recharged and it is usually thrown away. Another state for the cell is indicated by slightly higher voltage than the deeply discharged minimum voltage, indicating that the cell is discharged but can be recharged. A fourth state for the cell occurs when the terminal voltage exceeds a maximum voltage, indicating an overcharged cell.

In what are known as "intelligent" battery packs, the sensor circuit within the pack supplies cell voltage information to a battery microcontroller. The microcontroller in turn determines whether the battery pack needs to be charged, could be discharged, or needs to be thrown away. A battery pack of this type also includes a charge switch and a discharge switch, controlled by the microcontroller, which enable or disable the charging and discharging of the battery pack according to the state of the cells.

Rechargeable batteries have a limited cycle life, and discharge cycle time is usually measured in hours, not days. To confront this problem, computer manufacturers have begun to incorporate multiple battery packs in portable computer systems. Using multiple battery packs enables the user to remain in a mobile environment for longer periods of time. Multiple battery packs also provide a certain amount of power supply redundancy.

The use of multiple battery packs can cause design problems, however. If two or more battery packs are concurrently active, differences in charge levels between the packs can cause current to flow from one battery pack to another. Such "back charging" can have deleterious effects on the battery cells. To combat this and other problems, circuitry to assure that only one battery pack (the "master battery pack") is providing power to the system at any given time must be incorporated in either the host computer or the battery pack itself. This battery pack "arbitration" circuitry adds unwanted component cost and size to the computer system. Both cost and size are areas of particular concern in the portable computer market.

SUMMARY OF THE INVENTION

Briefly, the present invention relates to circuitry for selecting a master battery pack for supplying power to a computer system capable of incorporating multiple battery packs. In particular, a bi-directional master battery signal is supplied to the microcontroller of each installed battery pack, as well as arbitration circuitry contained within the host system. This signal is used to denote which battery in the system is supplying power—the master battery. The battery pack selected to be the master asserts the master battery signal while all other batteries monitor this signal waiting for it to be deasserted. A deassertion of the master battery signal denotes that the master battery pack has been removed.

The master battery signal works in conjunction with a serial bus interface between each of the battery packs in the computer system. In the preferred embodiment, the serial bus conforms to the standard I$^2$C-bus specification. The charge state of each installed battery pack as well as other information is communicated from each battery pack microcontroller to master battery selection circuitry contained in the host system. As with earlier battery packs, battery status information is provided by a sensor circuit coupled to the battery cells and the microcontroller of each pack. The sensor circuit monitors the battery for undervoltage, overvoltage, overcharge current, and overdischarge current conditions. The battery microcontroller is coupled through control logic to the control terminals of charge and discharge switches, thereby allowing the microcontroller to control the charge entering or leaving the battery pack.

In one embodiment of the invention, a newly installed battery pack causes the master battery signal to be deasserted as long as no other battery pack in the system is currently selected as the master battery pack. Deassertion of the master battery signal causes an internal battery discharge switch to close, allowing the battery to provide power to the computer system and also causing an interrupt to the battery pack's microcontroller. If the computer system determines that this battery is to be the current provider of power to the system based on the battery pack's charge status and/or other criteria, it returns a message over the serial bus interface denoting that the newly installed battery pack is now the new master. The battery pack then causes the master battery signal to be asserted. Assertion of the master battery signal, in turn, causes the discharge switches in all other battery packs to open. The master battery pack then closes its own charge switch, allowing power to be supplied to the computer system in a more efficient manner.

If the battery pack that is selected to be the master is removed from the system, or if it begins receiving current rather than sourcing current, the master battery signal is deasserted. Deassertion of the master battery signal causes the discharge switches in all remaining battery packs to close. The host computer system then decides which of any remaining battery packs should take command of the master battery line, commanding the selected pack to assert the master battery signal and become the master battery. Use of a master battery signal and serial interface allows the safety FETs of the battery pack to become part of the arbitration process. The invention therefore decreases the amount of circuitry necessary to select a master battery pack and also decreases the amount of message passing that is required.

BRIEF DESCRIPTION OF THE DRAWINGS

A better understanding of the present invention can be obtained with the following detailed description of the preferred embodiment is considered in conjunction with the following drawings, in which.

DETAILED DESCRIPTION OF THE PREFERRED EMBODIMENT

Figure 1:
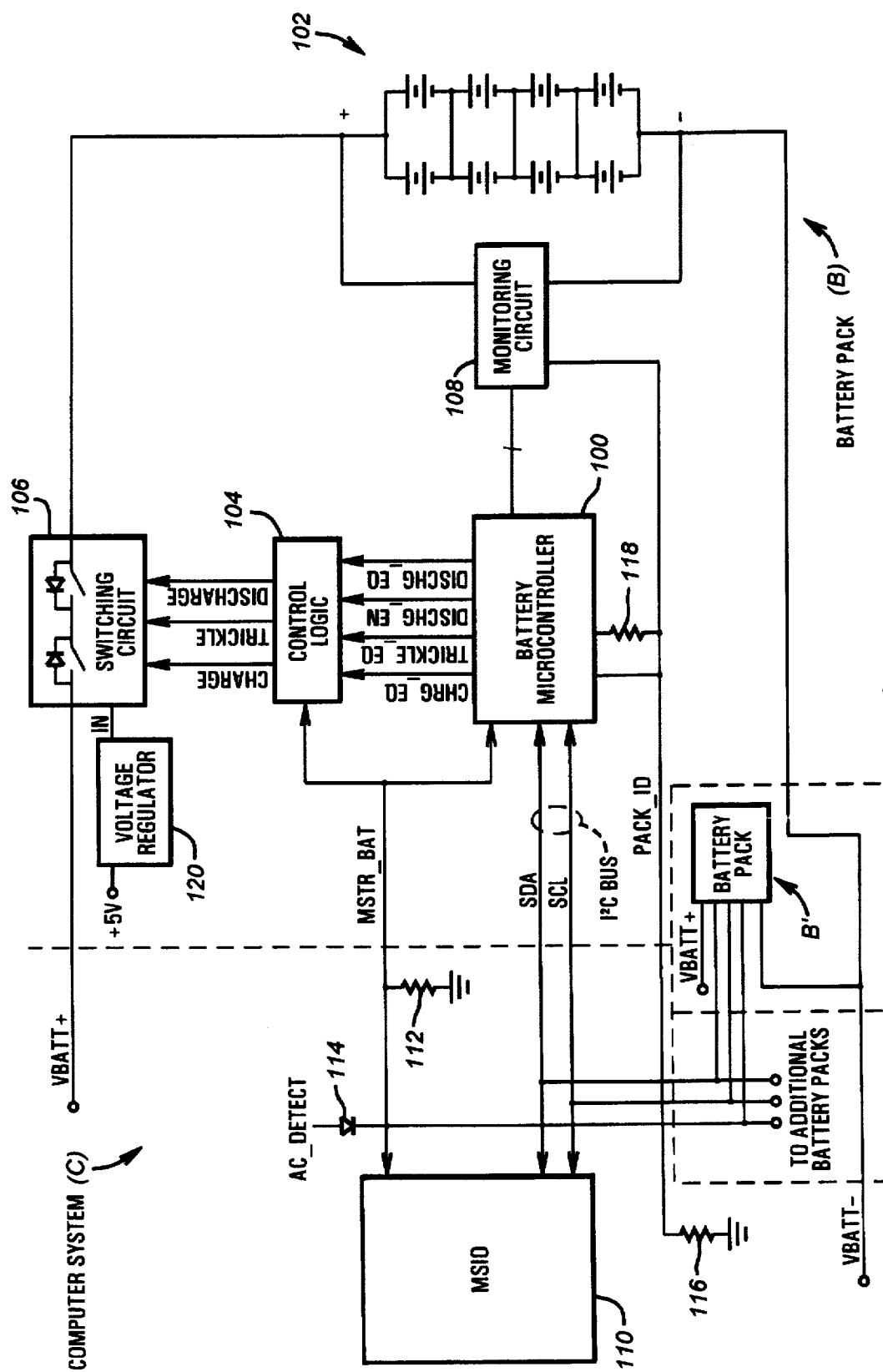
FIG. 1 is a block diagram illustrating a battery pack according to the invention inserted into a known host computer system.

Turning now to the drawings, FIG. 1 is a block diagram of a battery pack B inserted into a host computer system C. In the disclosed embodiment, host computer C is capable of both receiving power from and supplying power to battery pack B. The VBATT+ and VBATT− terminals are the positive and negative terminals, respectively, of battery pack B over which power is supplied to and received from host computer system C. FIG. 1 depicts a pair of installed battery packs B and B', although the preferred embodiment of the invention would include the capability to support a greater number of installed battery packs incorporating similar or identical circuitry.

Referring first to battery pack B, a battery microcontroller 100 is included to provide supervisory functions for controlling the charging and discharging of the battery cells 102. A CHARG_EQ signal, a TRICKLE_EQ signal, a DISCHG_EN signal, and a DISCHG_EQ signal are provided by the battery microcontroller 100 to a control logic block 104. These signals are used by the control logic block 104 (detailed in FIG. 2A) in generating control signals for various elements of a switching circuit 106 (FIG. 3). In particular, the control logic block 104 provides a CHARGE signal, a TRICKLE signal, and a DISCHARGE signal to the switching circuit 106. The control logic block 104 and the switching circuit 106 provide circuitry to inhibit or permit charge from entering or leaving battery cells 102. The CHARGE signal, the TRICKLE signal, and the DISCHARGE signal control the charging of the battery cells 102, the trickle charging of the battery cells 102, and the discharging of the battery cells 102, respectively. The assertion of one of these three control signals enables its function. Other signals and circuitry have been omitted for sake of clarity.

The switching circuit 106 is connected to the positive terminal "+" of the battery cells 102. In the preferred embodiment, the battery cells 102 of the battery pack B consist of four series banks of two parallel lithium ion cells, but various other configurations are contemplated. As described below in conjunction with FIG. 3, various transistors in the switching circuit block 106 control the charging and discharging of the battery cells 102. The switching circuit 106 is used to control the voltage VBATT+ supplied by the battery cells 102, as well as current flowing into and out of the battery pack B. In the preferred embodiment, both the VBATT+ and VBATT− contacts are capable of supplying a four ampere continuous load. In addition, these two power contacts are disabled if the battery pack determines that a charging voltage or current is being applied without valid handshaking over the control lines. The switching circuit 106 is also connected to the unregulated voltage input IN of a voltage regulator 120. The output of the voltage regulator 120 supplies a supply voltage of +5 volts.

Also shown in FIG. 1 is a monitoring circuit 108, which is connected to the "+" and "−" terminals of the battery cells 102. The monitoring circuit provides information to the battery microcontroller 100 regarding the status of the battery cells 102. Functions provided by the monitoring circuit 108 include, but are not necessarily limited to: battery cell overvoltage monitoring, cell undervoltage monitoring, overdischarge current monitoring, and overcharge current monitoring.

Turning now to the host computer C portion of FIG. 1, a multi-function mobile super input/output chip MSIO 110 is included in the preferred embodiment. The MSIO 110 provides various processing and control functions, and communicates with the battery microcontroller 100 via a standard I²C-bus and a master battery signal MSTR._BAT. The inter-integrated circuit (IC) or I²C-bus is a simple bi-directional two wire bus for efficient inter-IC control. Details of the I²C-bus can be found in the "The I²C-Bus and How to Use It (Including Specification)," published by Phillips Semiconductors, January 1992.

Briefly, the I²C-bus consists of two lines: a serial clock (SCL) and a serial data line (SDA). Each of these lines is bi-directional. The SCL line provides the clock signal for data transfers which occur over the I²C-bus. Logic levels for this signal are referenced to VBATT−, which is common to all installed battery packs B. The SDA line is the data line for data transfers which occur over the I²C-bus. Again, logic levels for this signal are referenced to VBATT−. As illustrated by a second installed battery pack B', the battery microcontroller 100 of any additional battery pack is also coupled to the MSIO 110 via the I²C-bus. Low value series resistors (not shown) are typically provided at each device connection for protection against high-voltage spikes.

Each device connected to the I²C-bus is recognized by a unique address—whether it is the MSIO 110 or the battery microcontroller 100 of any installed battery pack B. Both the MSIO 110 and battery microcontroller 100 incorporate an on-chip interface which allows them to communicate directly with each other via the I²C-bus. Further details regarding communication over the I²C-bus are provided below in conjunction with FIG. 2B. Using the I²C-bus in cooperation with the master battery signal MSTR_BAT reduces the number of interface signals necessary for efficient battery management. Co-pending U.S. patent application Ser. No. 08/573,296, entitled "BATTERY PACK WAKEUP" and filed on Dec. 15, 1995, illustrates various aspects of nickel-based and lithium ion battery packs and communications over a serial bus. This application is hereby incorporated by reference.

A resistor 116 is also included in the host computer C to aid in the generation of an analog PACK_ID signal. The PACK_ID signal is used to define the physical location of any installed battery pack within the computer system C. Each battery slot within the computer system C couples this signal to a resistor 116 of slightly different ohmage (only one such resistor is shown for sake of clarity). When the battery pack B is installed in the host computer C, one end of the resistor 116 is referenced to ground, while the other end is coupled to the battery microcontroller 100 through a resistor 118. The resistors 116 and 118 form a voltage divider, and the voltage present at the common node (the PACK_ID signal) is dependent on the values of the two resistors. The voltage level of the PACK_ID signal is different for each installed battery pack, as the value of the resistor 116 is also different. Each voltage level represents a unique slot location within the computer system C.

The PACK_ID signal is provided to the monitoring circuit 108. In the disclosed embodiment, the battery microcontroller 100 may request a digital representation of the voltage level of the PACK_ID signal from the monitoring circuit 108. The battery microcontroller 100 can then determine the value of the resistor 116 and resolve the battery pack's physical location and address within the system. The PACK_K) signal is coupled directly to an "interupt on transistion" input to the battery microcontroller 100. Before a battery pack B is installed, the PACK_ID signal is pulled to the positive supply by the large ohmage resistor 118. When the battery pack B is initially inserted into the computer system C, a transition on the PACK_ID signal serves to "wake up" the battery pack B and cause an attention signal to be sent to the computer system C via the I²C-bus. The attention signal, as described more fully below, alerts the host computer C to a newly installed battery pack B.

As alluded to above, the PACK_ID signal has other beneficial uses in the preferred embodiment. For example, this signal can be used as part of a safety circuit to electronically disable the terminals of the battery pack B when the battery pack is not installed in a computer system. In particular, the discharge and charge FETs of the battery pack are configured to remain off so long as the PACK_ID signal is pulled to the positive supply rail, as is the case when the battery pack B is not installed. Accidental charging and discharging of the battery pack B can thereby be avoided.

Of particular interest in the present specification, a bi-directional master battery signal MSTR_BAT is communicated between the battery microcontroller 100, control logic block 104, and the MSIO 110. In the preferred embodiment, all other installed battery packs B' (only one is shown for sake of clarity) also receive and drive the master battery signal MSTR_BAT. This signal is used to indicate which, if any, battery pack B is supplying power to or being charged by the host computer C. Master battery pack selection can be based on the charge status of installed battery packs, slot order, or various other criteria. The battery pack B selected to be the master battery asserts the master battery signal MSTR_BAT while all other installed battery packs and the MSIO 110 monitor the signal waiting for it to be deasserted. A low transition of the master battery signal MSTR_BAT generally signifies that the current master battery pack has either been removed or is no longer capable of supplying power.

When no battery packs are installed in the host computer C, a pulldown resistor 112 pulls the master battery signal MSTR_BAT to a logic low level. Likewise, when the battery pack B serving as the master battery pack is removed from the host computer C, resistor 112 pulls the master battery signal MSTR._BAT low. The transition to a low level causes the discharge FETs of all other installed battery packs to turn on. Additional details of the operation of the master battery signal MSTR_BAT are discussed more fully below in conjunction with the following figures.

The master battery signal MSTR_BAT can also used by the computer system C to indicate the presence of AC line power. If AC power is available, the power supply (not shown) asserts the AC detect signal AC_DETECT. This signal is diode OR'ed with the master battery signal MSTR_BAT by a diode 114. Therefore, if the signal AC_DETECT is high, the master battery signal MSTR_BAT is also high. Other methods of detecting AC power are also contemplated. For example, a comparator circuit could be used to detect when the supply voltage is above a certain predetermined level. In this embodiment, the predetermined voltage level is ideally set at a higher voltage than the battery pack B can supply. When the power supply voltage rises above this predetermined level, the AC detect signal AC_DETECT is asserted. Using this type of detection circuitry necessitates changes in the arbitration process. When a battery pack B is charging, for example, it must drive the master battery signal MSTR_BAT to a logic high level because the AC adapter voltage is pulled down to the voltage at which the battery pack B is charging. This in turn causes the AC detect signal AC_DETECT to be deasserted, even though AC power may still be available. To combat this potential problem, the battery pack B looks for a change in current direction. If current begins flowing out of the battery pack instead of into the battery pack during a charge cycle, the battery microcontroller 100 is able to discern that AC power is no longer present. The battery microcontroller 100 then turns off its charge FET and deasserts the master battery signal MSTR_BAT to force a new arbitration.

Due to the detection method used for AC power detection in the disclosed embodiment, once a battery pack B is granted permission to charge the computer system C it can no longer determine the presence of AC power. Therefore, the responsibility for AC power detection during charge again falls on the battery pack B currently being charged. Once granted permission to charge, the battery pack B must drive the master battery signal MSTR_BAT high and maintain this state as long as current is detected flowing into the battery during charge periods. During any charge period, if current is not detected flowing into the battery pack B, the battery microcontroller 100 ceases to assert the master battery signal MSTR_BAT and terminates charge with an abnormal charge termination signal, and issues an attention signal ATTN to the computer system C via the I²C-bus. In addition, if while designated master battery, a battery pack B detects it is receiving current rather than sourcing current to the computer system C, it surrenders its master battery status.

Figure 2A:
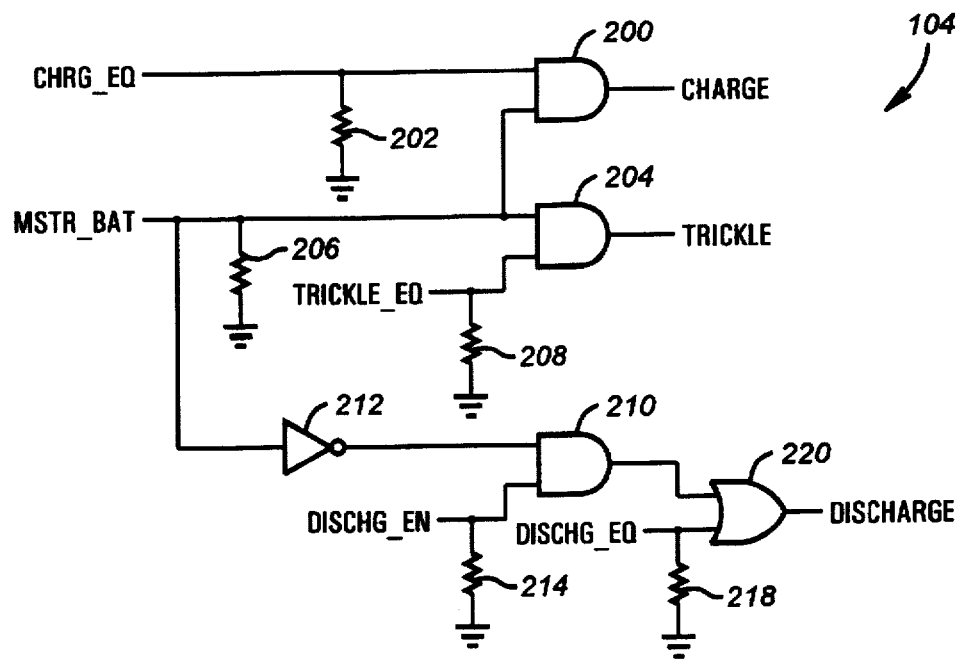
FIG. 2A is a schematic diagram providing details of the control logic of FIG. 1.
Figure 3:
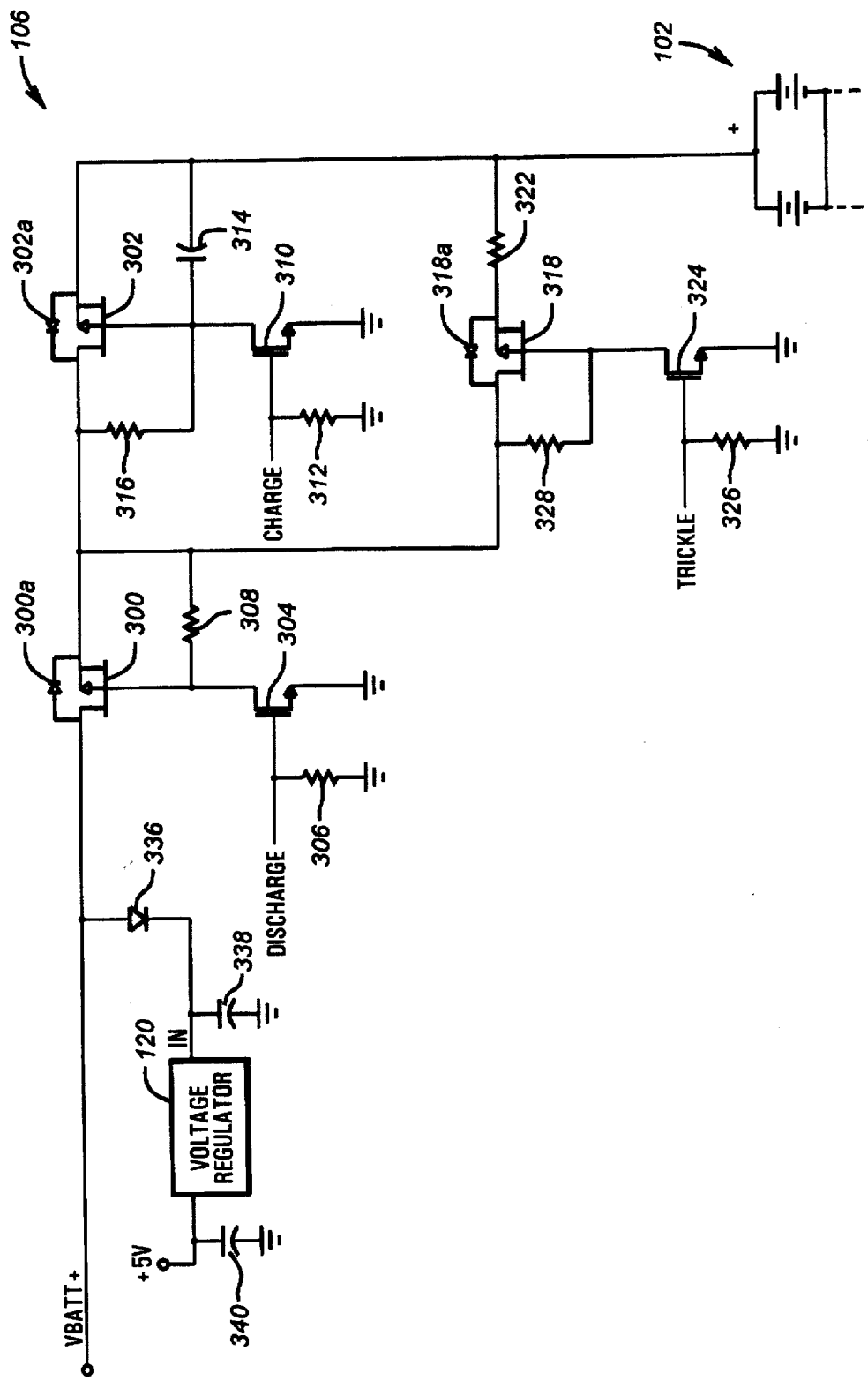
FIG. 3 is a schematic diagram of the switching circuitry of FIG. 1.

Referring now to FIG. 2A, details of the control logic 104 of FIG. 1 are shown. This circuitry is used to control the power FETs (hereinafter simply referred to as transistors) of the switching circuit 106 (FIG. 3). As mentioned, the CHRG_EQ, TRICKLE_EQ, DISCHG_EN, and DISCHG_EQ signals are provided by battery microcontroller 100. The CHARGE control signal is provided by the output of a two input AND gate 200, whose inputs include the master battery signal MSTR_BAT and the CHRG_EQ signal. A pulldown resistor 202 is provided at the latter input, and functions to deassert the charge signal CHARGE when the CHRG_EQ signal is not being driven. Thus, in order for the CHARGE signal to be asserted, both the CHRG_EQ and MSTR_BAT signals must be asserted.

The control signal TRICKLE is provided at the output of another two input AND gate 204. The inputs of this AND gate 204 are driven by the master battery signal MSTR_BAT and the TRICKLE_EQ signal. Pulldown resistor 206 is connected between the master battery signal MSTR_BAT and ground, pulling the signal to ground when it is not being driven. Likewise, pulldown resistor 208 is connected between the TRICKLE_EQ signal and ground. The TRICKLE signal is thereby asserted when the TRICKLE_EQ and MSTR_BAT signals are asserted.

The DISCHARGE signal is driven by the output of a two input OR gate 220. Inputs to this OR gate 220 include the DISCHG_EQ signal, which is also connected to ground through a pulldown resistor 218. The second input of the OR gate 220 is driven by the output of a two input AND gate 210. Inputs to this AND gate include the DISCHG_EN signal and the output of an inverter 212 whose input is the master battery signal MSTK_BAT. A pulldown resistor 214 pulls the DISCHG_EN signal to ground when it is not being driven. The DISCHARGE signal is only asserted when either the DISCHG_EQ signal is asserted, or when the DISCHG_EN signal is asserted while the MSTR_BAT signal is deasserted.

The DISCHG_EN signal is indicative of the state of the battery cells 102 as determined by the monitoring circuit 108 and the battery microcontroller 100. DISCHG_EN is asserted by the battery microcontroller 100 when the battery pack B is capable of sufficiently supplying power to the computer system C. Use of the DISCHG_EN signal allows the circuitry of FIG. 2A to assert the DISCHARGE signal and turn on the discharge transistor 300 (FIG. 3) when the master battery signal MSTK_BAT is released and pulled low by the resistor 112 (FIG. 1). Once a new master battery is chosen and the MSTR_BAT signal is reasserted, the battery microcontroller 100 can assert the DISCHG_EQ signal to allow the discharge transistor to remain in a conductive state.

The logic levels of the DISCHG_EQ, CHRG_EQ, and TRICKLE_EQ signals as set by the battery microcontroller 100 are determined by the following equations:

---

CHARGE/DISCHARGE EQUATIONS

DISCHG_EQ = MASTER * DISCHG_EN
CHRG_EQ =
(MASTER * FAST_CHG) + (MSTR_BAT * DISCHG_EN)
TRICKLE_EQ = MASTER * SLOW_CHG

---

The MASTER signal is a signal internal to the battery microcontroller 100, and is asserted when the battery microcontroller 100 receives an indication from the computer system C that it has been selected to be the new master battery pack. The FAST_CHG and SLOW_CHG signals are also signals internal to the battery microcontroller 100, and allow it to govern the rate of charging while current is being supplied to the battery pack B. Specifically, these signals are used to turn on the charge transistor 302 and trickle transistor 318 of FIG. 3.

Figure 2B:
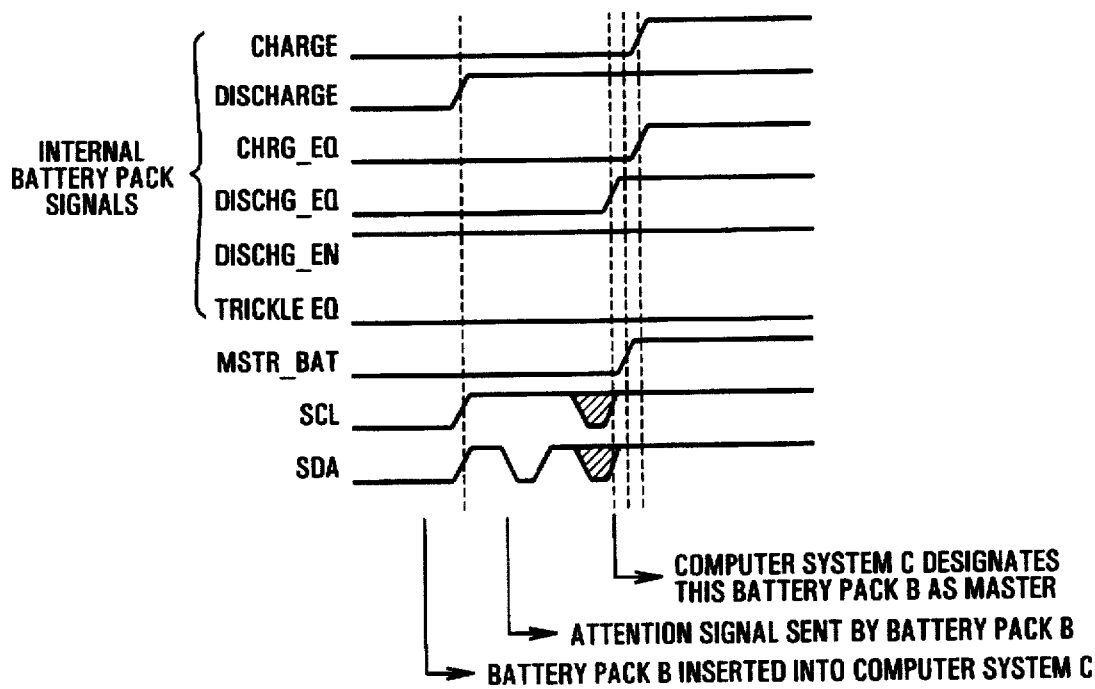
FIG. 2B is a timing diagram illustrating control signal transitions following insertion of a battery pack into a host computer system with no current master battery pack.

Exemplary interaction between the various signals of FIG. 2A is shown in FIG. 2B. In particular, FIG. 2B depicts signal transitions following insertion of a battery pack B into a host computer C that has no current master battery pack.

The newly installed battery pack B sees that the clock SCL and data SDA lines have been driven high by pullup resistors (not shown) in the host computer C. The logic of FIG. 2A also causes the DISCHARGE signal of the battery pack B to be asserted, thereby turning on the discharge transistor 300. In order for the battery microcontroller 100 to verify that the I$^2$C-bus is idle, either the clock line SCL must remain high for at least 1.0 milliseconds (ms) or the data line SDA must remain high for at least 9.0 ms. The battery microcontroller 100 then pulls the SDA line low for 1.0 to 3.0 ms, signalling the computer system C that one of the battery packs needs attention. This is the only time that the battery pack B acts as an I$^2$C-bus master. The computer system C then polls the battery packs one at a time to give each battery pack B a chance to communicate.

If the newly installed battery pack B is to be designated as the master battery pack, the computer system C instructs its battery microcontroller 100 to assert the DISCHG_EQ signal. As mentioned, selection of a master battery pack can be predicated on a number of factors, such as slot order or greatest discharge capability. Shortly after the DISCHG_EQ signal is asserted, the MSTR_BAT signal is also asserted by the battery microcontroller 100. In the disclosed embodiment, it is necessary to assert the DISCHG_EQ signal first in order to assure that the DISCHARGE signal remains asserted (i.e. assertion of the MSTR_BAT signal causes the output of the AND gate 210 to return to a logic low level). Assertion of the MSTR_BAT signal causes the discharge transistors of all other installed battery packs to turn off. At a sufficient time after this occurrence, the battery microcontroller 100 of the new master battery pack B asserts its CHRG_EQ signal, causing the CHARGE signal to be asserted. The charge transistor 302 is then turned on. As discussed more fully below, turning on the charge transistor allows the master battery pack to supply power in a more efficient manner.

Figure 2C:
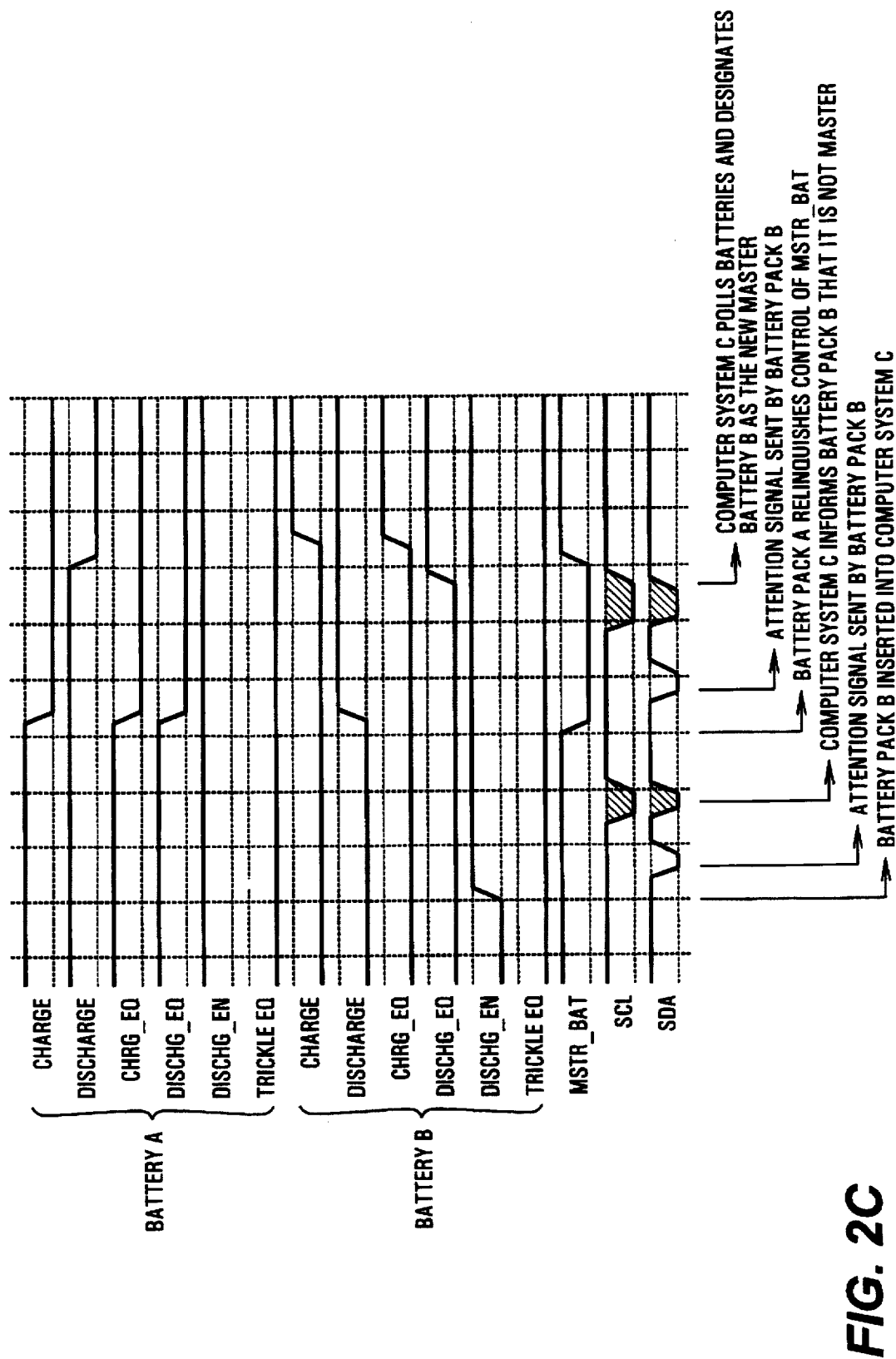
FIG. 2C is a timing diagram illustrating control signal transitions during the transition from one master battery pack to a second master battery pack.

Referring now to FIG. 2C, a timing diagram illustrating control signal transitions during the transition from a master battery pack A to a second master battery pack B. The newly installed battery pack B—which is capable of supplying power to the computer system C as indicated by assertion of its DISCHG_EN signal—first sends an attention signal to the computer system C via the I$^2$C-bus. Unlike the example of FIG. 2B, the DISCHARGE signal of battery pack B is not asserted at this point because the MSTR_BAT signal is being driven high by another battery pack A.

The attention signal causes the computer system C to poll all installed battery packs. It is also contemplated, however, that information gathered from earlier pollings of installed battery packs could be stored by the computer system C, alleviating it of the necessity to poll all battery packs except the newly installed battery pack. In the example of FIG. 2C, battery pack B is not selected as the master battery pack as a result of the polling.

At some later point, battery pack A is either removed from the computer system C or becomes incapable of supplying adequate power. It subsequently relinquishes control of the MSTK_BAT signal, and the MSTR_BAT signal is pulled low by the resistor 112 of FIG. 1. An attention signal is then sent to the computer system C by battery pack B, which causes the computer system C to again poll all installed battery packs in order to select a new master. According to FIG. 2C, battery pack B is then selected as the new master and asserts the MSTR_BAT signal, causing the discharge FETs of any installed battery packs to turn off. The DISCHG_EQ and CHRG_EQ signals of battery pack B function as in the previous figure.

The switching circuitry 106 is shown in greater detail in FIG. 3. Referring now to this figure, the discharge transistor 300, the charge transistor 302, and the trickle transistor 318 are shown. In the preferred embodiment, these are p-channel metal-oxide-semiconductor field-effect-transistors (MOSFETs) with a very low on-resistance as well as very low gate drive voltages. These transistors control the charging and discharging of the battery pack B. In addition to providing protection for the battery cells 102, the power transistors can be conceptualized as a sort of "distributed selector switch."

Referring first to the charge transistor 302, the source of this transistor is connected to the positive supply terminal "+" of the battery cells 102. The gate of the charge transistor 302 is connected to the drain of an N-channel transistor 310. The gate of this transistor 310 is driven by the CHARGE signal of FIG. 2A while its source is connected to ground. A large ohmage resistor 312 is also connected between the gate of the transistor 310 and ground. This resistor assures that the transistor 310 is not in a state of conduction in the event that the CHARGE signal is not driven.

A capacitor 314 is connected between the source and the gate of the charge transistor 302. Following assertion of the CHARGE signal, this capacitor 314 increases the time required for the charge transistor 302 to turn on when its gate is pulled low by the transistor 310, thereby reducing the chance of supply voltage ripple and unwanted electromagnetic interference. A resistor 316 is connected between the gate of the charge transistor 302 and its drain. The resistor 316 is included to prevent the gate of the charge transistor from floating at an indeterminate voltage level when the transistor 310 is not conducting. Stated another way, the resistor 316 prevents the charge transistor 302 from turning on accidentally.

The support circuitry for the trickle transistor 318 is configured in a similar fashion to that of the charge transistor 302. A resistor 322 connects the source of the trickle transistor 318 to the positive terminal "+" of the battery cells 102. The gate of the trickle transistor 318 is connected to the drain of an N-channel transistor 324, whose gate is driven by the TRICKLE signal of FIG. 2A and whose source is connected to ground. A pulldown resistor 326 connects the gate of the transistor 324 to ground to prevent the gate from floating if the TRICKLE signal is not being driven. A second resistor 328 is connected between the gate of the transistor 318 and its drain, preventing the transistor 318 from turning on when transistor 324 is off.

The drains of the transistors 302 and 318 are connected to the source of the discharge transistor 300. The gate of this discharge transistor 300 is connected to the drain of an N-channel transistor 304. The gate of transistor 304 is driven by the DISCHARGE signal of FIG. 2A, while its source is connected to ground. In addition, a pulldown resistor 306 is connected between the gate of the transistor 304 and ground to prevent the gate from floating when the DISCHARGE signal is not driven. A large ohmage resistor 308 connects the gate of the discharge transistor 300 to its source to turn off the transistor 300 when the transistor 304 is off.

The drain of the discharge transistor 300 provides the voltage present at the VBATT+ contact of the battery pack B. The anode of a diode 336 is connected to VBATT+, while its cathode is connected to the input IN of voltage regulator 120. This linear voltage regulator 120 provides a regulated supply voltage of +5V at its output. The supply voltage is used to provide power to the battery microcontroller 100. A capacitor 338 connected between the input of the voltage regulator 120 and ground and functions to stabilize the unregulated voltage input. A second capacitor 340 connects the +5V output to ground and serves to stabilize the regulated output voltage.

In order to allow the battery pack B to supply power to the computer system C, the DISCHARGE signal is asserted by the circuitry of FIGS. 1 and 2A. When this signal is asserted, the transistor 304 is turned on, effectively shorting the gate of the discharge transistor 300 to ground. This in turn generates sufficient gate to source voltage to turn on the discharge transistor 300. Assuming that the charge transistor 302 and trickle transistor 318 are non-conducting while the discharge transistor 300 is turned on, charge is allowed to flow from the battery cells 102 through the parasitic diode 302a of transistor 302, and through the discharge transistor 300 to the VBATT+ terminal. The discharge transistor 300 is normally turned on and the charge transistor 302 is normally off when the master battery signal MSTK_BAT is at a logic low level. This condition is illustrated more fully in conjunction with FIG. 2B.

As indicated in FIG. 2B, a new master battery pack B asserts its CHARGE signal after the discharge transistors 300 of all other battery packs have had sufficient time to be deactivated. The CHARGE signal turns on the transistor 310, which pulls the gate of the charge transistor 302 to ground. The charge transistor 302 does not fully turn on, however, until the capacitor 314 has been sufficiently discharged. As mentioned above, the capacitor 314 increases the time required for the charge transistor 302 to turn on, thereby reducing transient voltage spikes on the supply line. Turning on the charge transistor 302 allows the battery pack B to more efficiently supply power to the computer system C. While the charge transistor is off, current supplied by the battery pack B must travel through the parasitic diode 302a, which has a voltage drop of approximately 0.5 to 0.7 volts. This current path causes unused power (current * voltage) to be dissipated, and shortens the useful charge life of the battery cells 102. When the charge transistor 302 is conducting, however, very little power is dissipated through this element due to its low on-resistance.

The battery pack B can be charged by either the AC power source or by other installed battery packs. During either of the charging modes, the discharge transistor 300 is normally in a non-conducting state. This requires the charging current to pass through the parasitic diode 300a of the discharge transistor 300. In this manner, the battery cells 102 can be protected from excessive charging currents.

Two charging modes are contemplated-a fast charging and a slow charging mode (trickle) mode. In order for the battery pack B to be charged in the fast charging mode, the charge transistor 302 must be conducting. If it is off, the parasitic diode 302a blocks current flow into the battery cells 102.

During the slow charging mode, the TRICKLE signal is asserted while the CHARGE signal is deasserted. Assertion of the TRICKLE signal causes the transistor 324 to turn on, in turn placing the trickle transistor 318 in a conducting state. The slow charging mode is utilized when the battery cells 102 are at a predetermined and relatively low voltage. In this state, excessive charge current has the potential to damage the battery cells 102. Thus, the battery microcontroller 100 directs charge current to flow through the parasitic diode 300a, through the trickle transistor 318, and finally through a current limiting resistor 322 before reaching the battery cells 102. The battery cells 102 are thereby protected when in a depleted state.

Figure 4A:
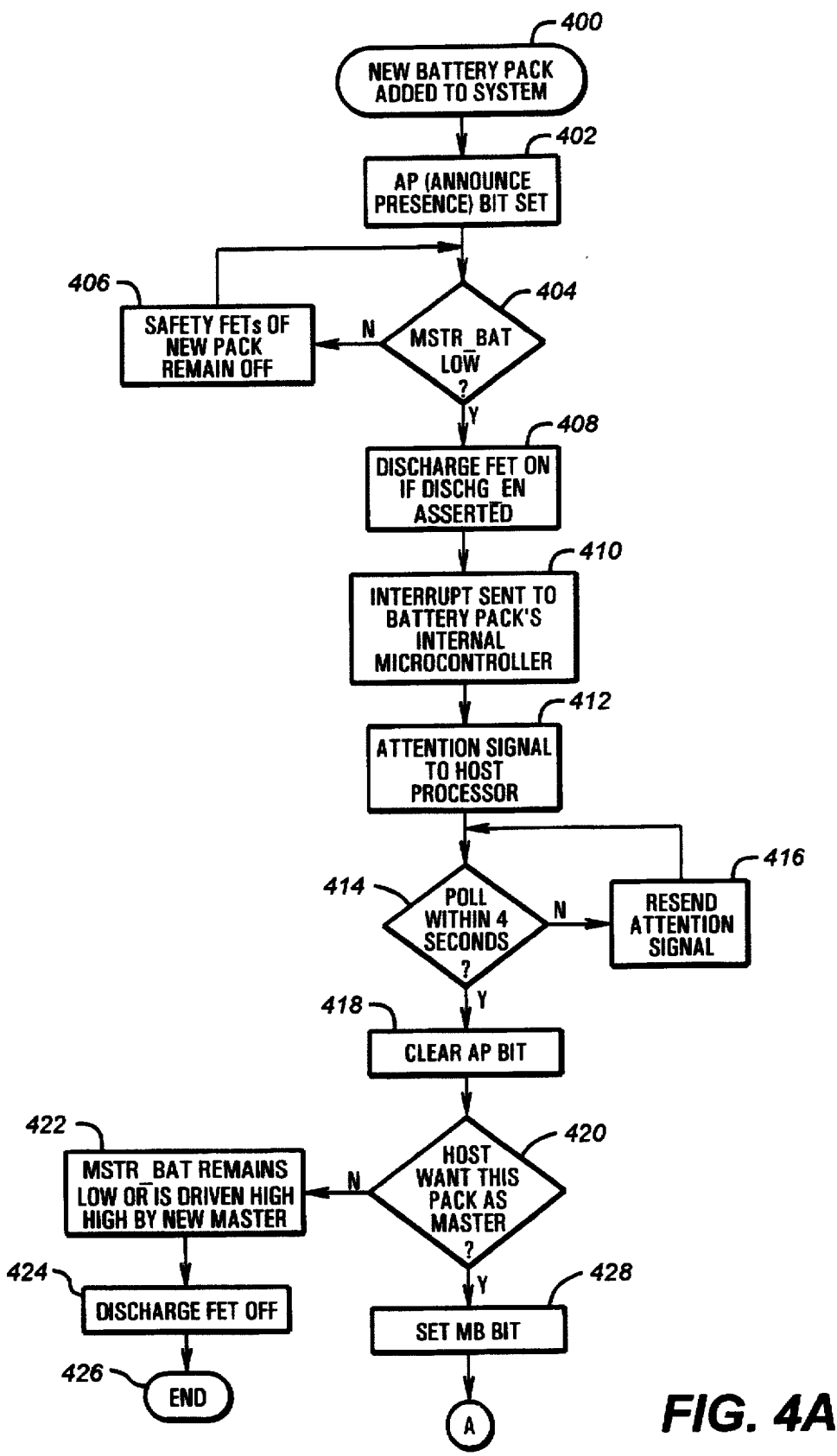
FIGS. 4A and 4B are flow chart illustrations depicting selection of a master battery pack when a new battery pack is added to the system.
Figure 4B:
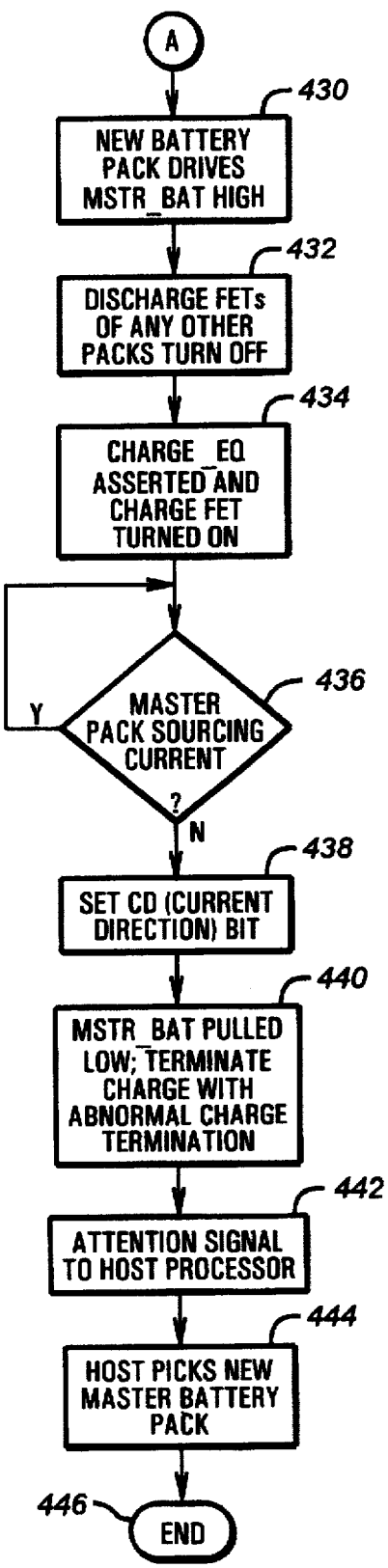

Turning now to FIGS. 4A and 4B, selection of a master battery pack following insertion of a new battery pack B is illustrated. The steps undertaken in these figures (as well as FIG. 5) represent general system-level processes, and are not intended to represent the actions of any one particular system component. The selection process begins in step 400 when a new battery pack is added to the computer system C. Control then proceeds to step 402, and the AP or announce presence bit is set in the battery microcontroller 100. The AP bit is one of several bit flags that can be set by the battery microcontroller to indicate the type of attention that the battery pack B is requesting. Other examples of the bit flags in the preferred embodiment include: a request for charge bit, a charge status bit, a request to set charging voltage and current bit, a low battery alarm bit, a permanent failure bit, a current direction bit, a test mode bit, an ampere hour reading bit, the master battery bit, a slow charge mode bit, a temporary failure bit, and various charge termination bits indicating normal, abnormal, or catastrophic charge termination.

Control next proceeds to step 404, where the newly installed battery pack determines the status of the MSTK_BAT signal. If the MSTR._BAT signal is asserted, the computer system C already has a master battery pack B (or AC power is present) and the discharge and charge transistors 300 and 302 of the newly installed battery pack B remain off. This action is shown by step 406. If the MSTR_BAT signal is at a logic low level as determined in step 404, control proceeds to step 408 and the discharge transistor 300 of the battery pack B is turned on if the battery pack's microcontroller 100 has asserted the DISCHG_EN signal, indicating that the battery pack is capable of supplying power to the computer system C. This function is implemented by the hardware FIG. 2A. Control then proceeds to step 410 and an interrupt is sent to the battery pack's microcontroller 100. Control then proceeds to step 412, where the interrupt causes the battery microcontroller 100 to send an attention signal to the MSIO 110. As shown in FIG. 2b, the attention signal is accomplished by pulling the I²C-bus data line SDA low and then releasing it after 1.0 to 3.0 ms.

Control next passes to step 414 and the battery microcontroller 100 monitors the I²C-bus to determine if the MSIO 110 polls the battery pack B within four seconds from the time the attention signal was sent. If not, control passes to step 416 in the attention signal is sent again and control returns to step 414. If the battery pack B is polled in a timely manner, control passes to step 418 and the AP bit is cleared. Control then proceeds to step 420 where the battery microcontroller 100 determines if the MSIO 100 wants the newly installed pack as the new master battery as indicated by operation codes communicated via the I²C-bus. If not selected, control proceeds to step 422 and the MSTR_BAT signal is either driven high by some other battery pack B that was chosen to be the master, or alternatively remains at a logic low level if no master battery pack B is selected. Control then proceeds to step 424 and the discharge transistor 300 of the newly installed battery pack B is turned off. Control then passes to step 426 and the arbitration process is ended.

If the newly installed battery pack B is chosen as master as determined in step 420 (i.e., the MSIO 102 sends the proper operation code to the new battery pack's address), control proceeds to step 428 and the battery microcontroller 100 sets its internal master battery bit MB. Control then proceeds to step 430 of FIG. 4B, and the new battery pack asserts the MSTK_BAT signal. Control proceeds to step 432 and the discharge transistors 300 of any other installed battery packs are turned off by the MSTR_BAT signal. The battery microcontroller 100 of the new master battery pack then asserts its CHARGE_EQ signal in step 434, causing its charge transistor 302 to be turned on. Control next proceeds to step 436 and the new master battery pack continues supplying power to the computer system C until it is no longer sourcing current. A change in current direction could be indicative, for example, of either AC power being present within the system or that the battery cells 102 are simply depleted of useful charge.

At this point, control passes to step 438 and the battery microcontroller 100 sets its internal current direction bit CD indicating that current is no longer being sourced. Control next proceeds to step 440, and the battery microcontroller 100 relinquishes control of the MSTK_BAT signal and sets its charge termination bits to indicate an abnormal charge termination. Once it is no longer driven, the MSTR_BAT signal is pulled low by the resistor 112. Control proceeds to step 442 and an attention signal is again sent to the MSIO 110 via the I²C-bus. Finally, control passes to step 444 and the MSIO 110 picks a new master battery pack B and the arbitration process ends in step 446.

Figure 5:
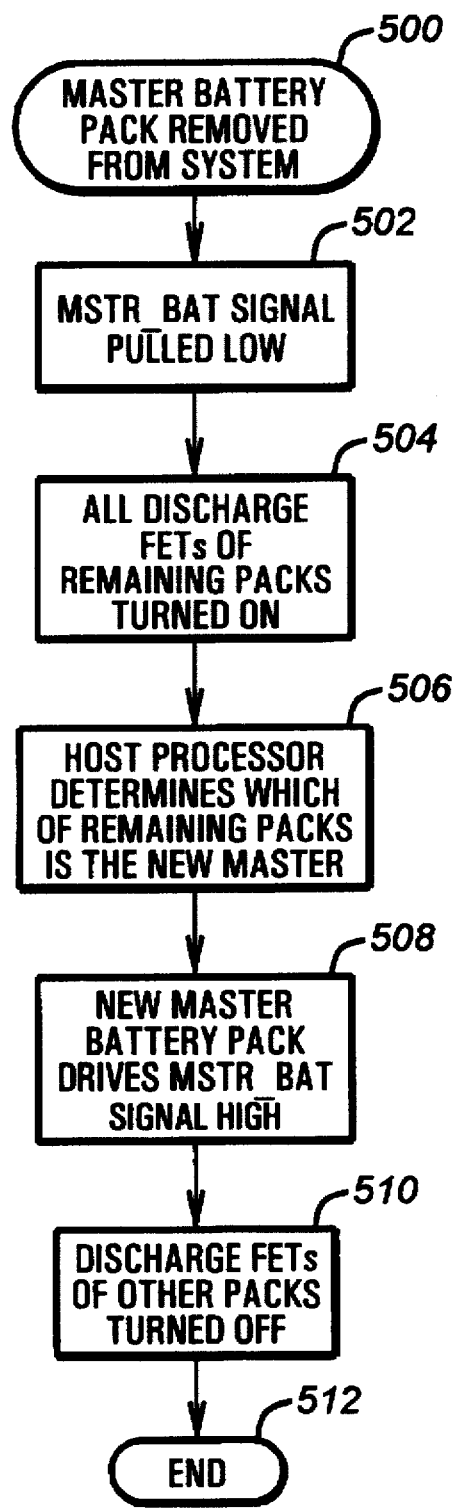
FIG. 5 is a flow chart illustration of steps undertaken by a system according to the invention when a battery pack is removed.

Referring now to FIG. 5, removal of a master battery pack B from a computer system C according to the present invention is shown. Following removal of the master battery pack B in step 500, control proceeds to step 502 where the resistor 112 (FIG. 1) causes the MSTR_BAT signal to be pulled low. Control then proceeds to step 504 where the discharge transistors 300 of any remaining battery packs are turned on. Control passes to step 506 where the MSIO 110 determines which, if any, of the remaining battery packs is to be the new master battery pack B. Control then passes to step 508 where the new master battery pack B drives the MSTR._BAT signal high. Control proceeds to step 510 and the discharge transistors 300 of any remaining battery packs are turned off The arbitration process is then ended in step 512.

Thus, circuitry for selecting a master battery pack in a computer system capable of incorporating multiple battery packs has been described. A bi-directional master battery signal is supplied to the microcontroller of each installed battery pack, as well as arbitration circuitry contained within the host system. The master battery signal operates in conjunction with a serial bus interface between each of the battery packs in the computer system to determine which battery pack is to supply the computer system with power. The battery pack selected to be the master asserts the master battery signal while all other batteries monitor this signal waiting for it to be deasserted. Other battery packs utilize the master battery signal to control their own charge and discharge circuitry. Deassertion of the master battery signal denotes that the master battery pack has been removed and a new master battery pack B is to be selected. Utilizing a master battery signal in this manner reduces the amount of circuitry required to select and designate a master battery pack.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit and scope of the invention.

What is claimed is:

1. A battery pack for providing power to a host computer system with battery pack arbitration circuitry, said battery pack comprising:

battery pack terminals;

battery cells;

discharge enabling circuitry coupled to said battery pack terminals and said battery cells, said discharge enabling circuitry when enabled permitting discharge of said battery cells through said battery pack terminals and otherwise blocking discharge of said battery cells; and data processing circuitry electrically coupled to said discharge enabling circuitry, said data processing circuitry comprising:

a serial bus interface for communicating battery status information to the battery pack arbitration circuitry of the host computer system and for receiving selection commands from the battery pack arbitration circuitry of the host computer system;

a master battery signal line interface for communicating a master battery signal;

logic responsive to said master battery signal and responsive to selection commands received over said serial bus interface for controlling said discharge enabling circuitry; and logic for selectively providing said master battery signal responsive to selection commands received over said serial bus interface.

2. The battery pack of claim 1, wherein said logic responsive to said master battery signal and responsive to selection commands received over said serial bus interface activates said discharge enabling circuitry when said master battery signal indicates that the battery pack arbitration circuitry of the host computer system has not selected a master battery pack.

3. The battery pack of claim 1, wherein said logic responsive to said master battery signal and responsive to selection commands received over said serial bus interface deactivates said discharge enabling circuitry when said master battery signal indicates that the battery pack arbitration circuitry of the host computer system has selected another source of power to serve as the master battery.

4. The battery pack of claim 1, wherein said logic for selectively providing said master battery signal responsive to selection commands received over said serial bus interface asserts said master battery signal when the selection commands indicate said battery pack is the master battery pack.

5. The battery pack of claim 1, further comprising charge enabling circuitry electrically coupled to said data processing circuitry, said battery cells, and said battery pack terminals.

6. The battery pack of claim 5, wherein said logic responsive to said master battery signal and responsive to selection commands received over said serial bus interface also controls said charge enabling circuitry, and wherein said logic activates said charge enabling circuitry when the selection commands indicate said battery pack is the master battery pack.

7. The battery pack of claim 1, wherein said serial bus interface is compliant with the I²C-bus specification.

8. The battery pack of claim 1, further comprising battery pack identification means electrically coupled to said data processing circuitry, said identification means being capable of providing information for determining battery pack location within the host computer system.

9. The battery pack of claim 8, wherein said battery pack identification means comprise circuitry capable of connecting to and discerning the ohmage of an identification resistor within the host computer system.

10. The battery pack of claim 1, further comprising sensor circuitry electrically coupled to said data processing circuitry for determining and providing battery cell status information.

11. A computer system capable of being powered by battery packs, said computer system comprising:

at least one battery pack interface;

battery pack arbitration circuitry coupled to said at least one battery pack interface;

a serial bus for communicating battery pack status information from said at least one battery pack interface to said battery arbitration circuitry and for communicating commands from said battery arbitration circuitry to said at least one battery pack interface for selecting a battery pack connected to said at least one battery pack interface; and a master battery signal line for communicating a master battery signal from said at least one battery pack interface to said battery arbitration circuitry, said master battery signal indicating whether a battery pack is functioning as a master battery pack to supply power to said computer system.

12. The computer system of claim 11, wherein said battery pack arbitration circuitry selects a master battery pack based on the amount of charge stored in each installed battery pack as determined by battery pack status information communicated via said serial bus.

13. The computer system of claim 11, wherein said at least one battery interface includes a plurality of battery interfaces, said computer system further comprising means for determining if a battery is connected to each battery interface of said plurality of battery interfaces.

14. The computer system of claim 11, wherein said battery pack arbitration circuitry selects a master battery pack from battery packs determined to be connected to said plurality of battery interfaces, said selection based on a predetermined ordering of battery interfaces in said plurality of battery interfaces.

15. The computer system of claim 11, wherein said serial bus interface is compliant with the I²C-bus specification.

16. The computer system of claim 11, further comprising:

means for detecting the presence of alternating current power and providing a signal to said master battery signal line preventing the discharge of batteries upon detection of alternating current power.

17. A combination of a host computer system and at least one battery pack, the combination comprising:

a master battery signal line for communicating a master battery signal indicating whether the at least one battery pack is supplying power to a host computer system;

a serial bus;

the host computer system having battery pack arbitration circuitry, said battery pack arbitration circuitry being electrically coupled to said serial bus in order to receive battery pack status information and to communicate commands for selecting a master battery pack, said battery pack arbitration circuitry further being electrically coupled to said master battery signal line in order to receive the master battery signal; and said at least one battery pack installed in said host computer system, said at least one battery pack comprising:

battery pack terminals;

battery cells;

discharge enabling circuitry coupled to said battery pack terminals and said battery pack cells, said discharge enabling circuitry when enabled permitting discharge of said battery cells through said battery pack terminals and otherwise blocking discharge of said battery cells;

data processing circuitry electrically coupled to said discharge enabling circuitry, said master battery signal line, and said serial bus, said data processing circuitry comprising:

logic responsive to the master battery signal and responsive to selection commands received over said serial bus for controlling said discharge enabling circuitry; and logic for selectively providing the master battery signal in response to selection commands received over said serial bus.

18. The combination of claim 17, wherein said logic responsive to the master battery signal and responsive to selection commands received over said serial bus activates said discharge enabling circuitry when the master battery signal indicates that said battery pack arbitration circuitry of said host computer system has not selected a master battery pack.

19. The combination of claim 17, wherein said logic responsive to the master battery signal and responsive to selection commands received over said serial bus deactivates said discharge enabling circuitry when the master battery signal indicates that said battery pack arbitration circuitry of said host computer system has selected another source of power to be the master battery.

20. The combination of claim 17, wherein in a particular one of said at least one battery pack, said logic for selectively providing the master battery signal in response to selection commands received over said serial bus asserts the master battery signal when the selection commands indicate said particular one of said at least one battery pack is the master battery pack.

21. The combination of claim 17 wherein said at least one battery pack further comprises charge enabling circuitry electrically coupled to said data processing circuitry, said battery cells, and said battery pack terminals.

22. The combination of claim 21, wherein in a particular one of said at least one battery pack said logic responsive to said master battery signal and responsive to selection commands received over said serial bus also controls said charge enabling circuitry, and wherein said logic activates said charge enabling circuitry when the selection commands indicate said particular one of said at least one battery pack is the master battery pack.

23. The combination of claim 17, wherein said serial bus is compliant with the I²C-bus specification.

24. The combination of claim 17, further comprising battery pack identification means electrically coupled to said data processing circuitry, said identification means being capable of providing information for determining battery pack location within said host computer system.

25. The combination of claim 24, wherein said battery pack identification means comprise circuitry connecting to and discerning the ohmage of an identification resistor within the host computer system.

26. The combination of claim 17, wherein said battery pack arbitration circuitry selects one of said at least one battery pack to be the master battery pack based on the amount of charge stored in each of said at least one battery pack.

27. The combination of claim 17, further comprising:

means for detecting the presence of alternating current power and providing a signal to said master battery signal line upon detection of alternating current power.

28. A method for selecting a master battery pack for supplying power to a host computer system capable of incorporating at least one battery pack, said host computer system having no current master battery pack, said method comprising the steps of:

determining that no battery pack is currently serving as the master battery pack by examining the voltage level of a master battery signal line linking the host computer system to installed battery packs;

determining the charge status of any battery packs installed in the host computer system via communications over a serial bus interface between the host computer system and installed battery packs;

selecting a master battery pack based on predetermined selection criteria; and communicating the selection to the new master battery pack via further communications over the serial bus interface.

29. The method of claim 28, further comprising the step of:

communicating the selection of the master battery pack to any other installed battery packs by providing an appropriate signal on the master battery signal line.

30. The method of claim 29, further comprising the step of:

signalling the host computer system of the presence of a newly installed battery pack via communications over the serial bus interface if the voltage level of the master battery signal line indicates that no battery pack is currently serving as the master battery pack.

31. The method of claim 28, the method further comprising the step of:

prior to said step of determining that no battery pack is currently serving as the master battery pack, causing the voltage level of the master battery signal line to transition to a level indicating that the prior master battery pack has either been removed from the host computer system or is no longer the preferred source of power to the computer system.

* * * * *

UNITED STATES PATENT AND TRADEMARK OFFICE
CERTIFICATE OF CORRECTION

PATENT NO. : 5,717,937
DATED : 2/10/98
INVENTOR(S) : BRIAN C. FRITZ

It is certified that error appears in the above-identified patent and that said Letters Patent is hereby corrected as shown below:

Column 13, line 59, please delete "the" and insert --a-- therefor.

Column 15, line 40, please insert --interface-- after "bus."

Column 15, line 50, please delete the comma after "battery."

Signed and Sealed this

Fourteenth Day of April, 1998

*Attest:*

BRUCE LEHMAN

*Attesting Officer*     *Commissioner of Patents and Trademarks*